US012582147B2

(12) United States Patent
Vafeiadi et al.

(10) Patent No.: US 12,582,147 B2
(45) Date of Patent: Mar. 24, 2026

(54) FULLY CALORIC, SLOWLY DIGESTIBLE CARBOHYDRATE COMPOSITION

(71) Applicant: SOCIETE DES PRODUITS NESTLE S.A., Vevey (CH)

(72) Inventors: Christina Vafeiadi, Lausanne (CH); Lisa Marcela Lamothe, Lausanne (CH); Andreas Rytz, Carrouge (CH); Christian Darimont-Nicolau, Lausanne (CH); Celia Francey, Berne (CH); Jaclyn Lerea-Antes, Metuchen, NJ (US); Gerhard Ufheil, Chatham, NJ (US); Julie Ann Swanson, Minneapolis, MN (US); Delphine Gisele Curti, Bettens (CH)

(73) Assignee: Societe des Produits Nestle S.A., Vevey (CH)

( * ) Notice: Subject to any disclaimer, the term of this patent is extended or adjusted under 35 U.S.C. 154(b) by 869 days.

(21) Appl. No.: 17/756,438

(22) PCT Filed: Jan. 8, 2021

(86) PCT No.: PCT/EP2021/050309
§ 371 (c)(1),
(2) Date: May 25, 2022

(87) PCT Pub. No.: WO2021/140223
PCT Pub. Date: Jul. 15, 2021

(65) Prior Publication Data
US 2023/0010414 A1      Jan. 12, 2023

Related U.S. Application Data

(60) Provisional application No. 62/958,941, filed on Jan. 9, 2020.

(51) Int. Cl.
*A23L 33/125* (2016.01)
*A23K 20/163* (2016.01)
(Continued)

(52) U.S. Cl.
CPC .......... *A23L 33/125* (2016.08); *A23K 20/163* (2016.05); *A23K 50/40* (2016.05);
(Continued)

(58) Field of Classification Search
None
See application file for complete search history.

(56) References Cited

U.S. PATENT DOCUMENTS

| | | |
|---|---|---|
| 8,512,739 B2 | 8/2013 | Carlson et al. |
| 2003/0229923 A1 | 12/2003 | Kossmann et al. |
| 2016/0127448 A1 | 5/2016 | Park et al. |

FOREIGN PATENT DOCUMENTS

| | | |
|---|---|---|
| WO | 2009095278 | 8/2009 |
| WO | 2016047616 A1 | 3/2016 |

OTHER PUBLICATIONS

Laurie C. Dolan et al, "Safety evaluation of fibermalt," Food and Chemical Toxicology, 50, 2012, 2515-2523.*
(Continued)

*Primary Examiner* — Michael Forrest
*Assistant Examiner* — Nicole Lee Quist
(74) *Attorney, Agent, or Firm* — K&L Gates LLP

(57) ABSTRACT

The present invention relates to a digestible carbohydrate composition comprising at least 65% (w/w) glucose-based saccharides on a dry basis, wherein said saccharides have a reducing end and D-glucose monomers linked with alternating α1-6 and α1-3 glycosidic linkages, wherein a maltose unit is present at the reducing end; and 0.1 to 30% (w/w) of
(Continued)

Process of making the digestible carbohydrate composition:

fructose equivalents on a dry basis; wherein said glucose-based saccharides have an average degree of polymerization greater than 12.

15 Claims, 14 Drawing Sheets

(51) Int. Cl.
  *A23K 50/40*     (2016.01)
  *C13K 1/00*     (2006.01)
  *C13K 11/00*     (2006.01)
(52) U.S. Cl.
  CPC ................ *C13K 1/00* (2013.01); *C13K 11/00* (2013.01); *A23V 2002/00* (2013.01)

(56)      References Cited

OTHER PUBLICATIONS

Cote et al. "A method for surveying and classifying *Leuconostoc* spp. glucansucrases according to strain-dependent acceptor product patterns" J. Ind. Microbiol. Biotechnol., 2005, vol. 32, pp. 53-60.
Dolan et al. "Safety evaluation of fibermalt" Food and Chemical Toxicology, 2012, vol. 50, pp. 2515-2523.
Côté et al., "Alternansucrase Acceptor Products", Biocatalysis and Biotransformation, vol. 26, Issue No. 1-2, 2008, pp. 161-168.
Japanese Office Action for Appl No. 2022-541011 dated Jun. 10, 2025, 3 pages.

* cited by examiner

Prior art:

Process of making the digestible carbohydrate composition:

Prior art:

Invention:

1   2   3   4   5   6

DP 5

DPE 10

DP 15

FULLY CALORIC, SLOWLY DIGESTIBLE CARBOHYDRATE COMPOSITION

CROSS REFERENCE TO RELATED APPLICATIONS

The present application is a National Stage of International Application No. PCT/EP2021/050309, filed on Jan. 8, 2021. which claims priority to U.S. Provisional Patent Application No. 62/958,941, filed on Jan. 9, 2020, the entire contents of which are being incorporated herein by reference.

BACKGROUND

Carbohydrates play a unique role in the human diet. They provide technical functionality like that of texturizers or bulking agents. In some cases, they can be viewed as sweeteners. They also provide energy and modulate blood glucose levels.

Consumption of carbohydrates that are fully caloric such as glucose syrup, maltodextrins, sugar, and starch hydrolysates typically result in high blood glucose peaks.

Current α-glucan ingredients available in the market like glucose syrups, isomaltooligosaccharides, starch hydrolysates are also not slowly-digestible enough in that their maximum concentration (Cmax) and incremental area under the curve (iAUC) are not reduced enough versus those of glucose. Furthermore, unpurified of α-glucan ingredients, like the commercially available Sucromalt, they have a high monosaccharide content, especially fructose, which contributes to added sugars. In addition, raw starches like wheat starch, which are known to have a reduced Cmax and iAUC versus glucose, are not fully soluble and lose these properties upon heat treatment, especially in liquid applications.

Other α-glucan ingredients of higher molecular weights such as resistant dextrins, poyledxtrose, dextrans and reuteran are likely not fully-caloric because of their partial resistance to digestion.

There is a clear need to bring improved fully-caloric and slowly-digestible carbohydrate compositions to the market which do not have the above disadvantages.

SUMMARY OF THE INVENTION

The inventors of the present application have surprisingly found a composition which does not have the disadvantages of prior art carbohydrate compositions. There is minimal contribution to added sugar, defined as being comprised of no more than 5-10% sugars (mono- and disaccharides). It contributes little or no fructose. Furthermore, it is fully caloric (3.5-4 kcal/g).

The composition is also suitable for ready to drink (RTD) or ready to use (RTU) liquid matrices.

The composition is also suitable for ready to mix or powder applications.

In a first aspect, the present invention relates to a digestible carbohydrate composition comprising a. at least 65% (w/w) glucose-based saccharides on a dry basis, wherein said saccharides have a reducing end and D-glucose monomers linked with alternating α1-6 and α1-3 glycosidic linkages, wherein an acceptor molecule is present at the reducing end; and b. 0.1 to 30% (w/w) of fructose equivalents on a dry basis; and wherein said glucose-based saccharides have an average degree of polymerization greater than 12, and wherein the acceptor molecule is preferably a maltose unit.

In a second aspect, the invention relates to a food product or beverage comprising said digestible carbohydrate composition.

In a third aspect, the invention relates to a method of reducing postprandial glucose in a subject, comprising administering an effective amount of said food product or beverage or said digestible carbohydrate composition, to a subject in need thereof.

DETAILED DESCRIPTION OF THE INVENTION

Digestible Carbohydrate Composition

Figure 1A:
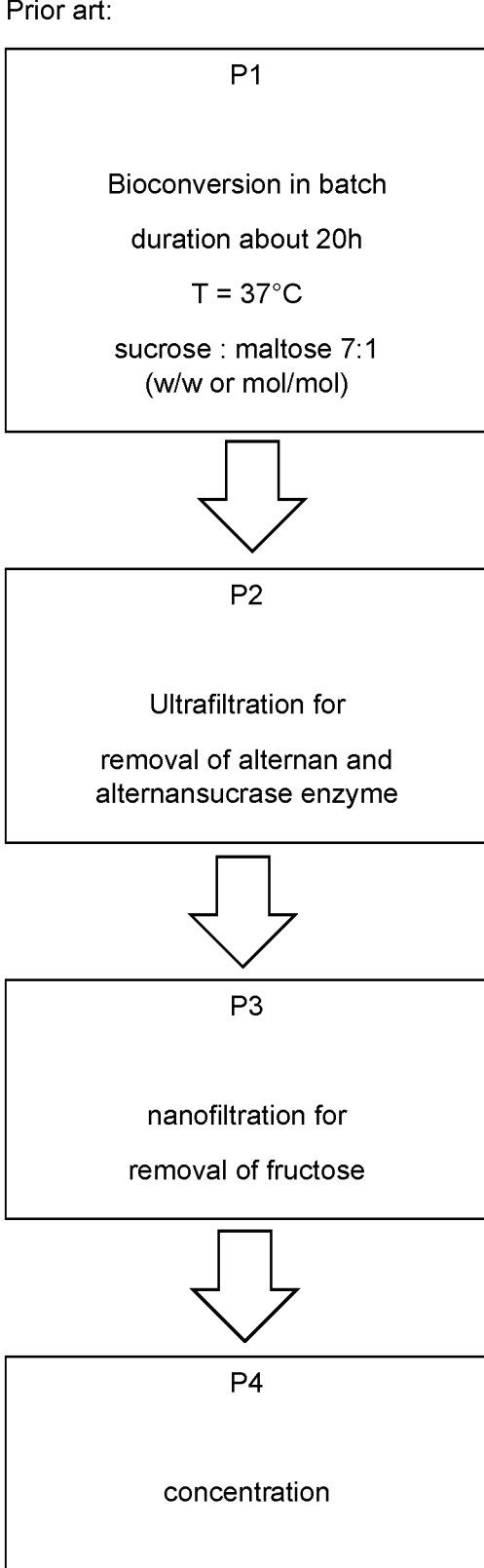
FIG. 1a shows a scheme of the process according to the prior art.

The invention relates to a digestible carbohydrate composition comprising at least 65% (w/w) glucose-based saccharides on a dry basis, wherein said saccharides have a reducing end and D-glucose monomers linked with alternating α1-6 and α1-3 glycosidic linkages, wherein an acceptor molecule is present at the reducing end; and less than 30% (w/w) of fructose equivalents on a dry basis; and wherein said glucose-based saccharides have an average degree of polymerization greater than 12, and wherein the acceptor molecule is preferably a maltose unit.

In particular, the invention relates to a digestible carbohydrate composition comprising

3 a. at least 65% (w/w) glucose-based saccharides on a dry basis, wherein said saccharides have a reducing end and D-glucose monomers linked with alternating α1-6 and α1-3 glycosidic linkages, wherein an acceptor molecule is present at the reducing end; and b. 0.1 to 30% (w/w) of fructose equivalents on a dry basis;

and wherein said glucose-based saccharides have an average degree of polymerization greater than 12, and wherein the acceptor molecule is preferably a maltose unit.

The acceptor molecule is preferably a carbohydrate or a carbohydrate derivative.

An acceptor molecule may be selected from a sugar or sugar alcohol having free hydroxyl groups at one or more of carbon positions numbers 2, 3 and 6 that can accept a glucose unit from sucrose.

The carbohydrate acceptor is preferably a saccharide selected from the group consisting of maltose, isomaltose, maltitol, (iso)maltotriose and methyl-α-D-glucan units. Other preferred acceptor molecules are glucose, gentiobiose, raffinose, melibiose, isomaltitol, isomaltooligosaccharide, theanderose, kojibiose, glucosyl trehaloses, cellobiose, maltotetraose, nigerose, lactose, panose units or mixtures thereof.

Preferably, the acceptor molecule is a maltose unit.

Average degree of polymerization is determined either with GPC-RI (gel permeation chromatography with refractive index detection) or GPC-MALLS (gel permeation chromatography with multi angle light scattering), or with HPAEC-PAD (High performance anion exchange chromatography with pulsed amperometric detection).

Preferably, average degree of polymerization (or weight average degree of polymerization) is determined with HPAEC-PAD.

The average degree of polymerization may be between 12 to 90, or 12 to 70, or 12 to 50, or 12 to 35, or 12 to 30, or 12 to 20, or 12 to 18 (HPAEC-PAD).

The average degree of polymerization may be greater than 13, 14, 15, or 16 (HPAEC-PAD). In some embodiments, the average degree of polymerization is greater than 17 (HPAEC-PAD).

The average degree of polymerization may be less than 90, 70, 50, 35, 20, 19, or 18 (HPAEC-PAD).

The composition typically provides only minimal contribution to added sugar in the form of mono-saccharides and di-saccharides. Preferably, the composition comprises less than 10% (w/w), 9% (w/w), 8% (w/w), 7% (w/w), 6% (w/w), or 5% (w/w) added sugar in the form of mono-saccharides and disaccharides.

In some embodiments, the composition has between 65 to 99% (w/w) glucose-based saccharides on a dry basis.

In some embodiments, the composition has between 75 to 95% (w/w) glucose-based saccharides on a dry basis.

In some embodiments, the composition has between 85 to 90% (w/w) glucose-based saccharides on a dry basis.

In some embodiments, the composition has at least 70% (w/w) glucose-based saccharides on a dry basis, preferably at least 75% (w/w).

In some embodiments, the composition has at least 80% (w/w) glucose-based saccharides on a dry basis, preferably at least 85% (w/w).

The composition typically provides only small amounts of fructose equivalents on a dry basis.

In some embodiments, said composition comprises less than 25% (w/w) of fructose equivalents on a dry basis.

In some embodiments, said composition comprises less than 20% (w/w) of fructose equivalents on a dry basis.

In some embodiments, said composition comprises less than 10% (w/w) of fructose equivalents on a dry basis. Preferably, said composition comprises less than 9% (w/w), less than 8% (w/w), less than 7% (w/w), less than 6% (w/w), less than 5% (w/w), less than 3% (w/w), less than 2% (w/w), less than 1% (w/w), or less than 0.5% (w/w) of fructose equivalents on a dry basis.

In some embodiments, said composition comprises 0.1 to 25% (w/w), or 0.1 to 20% (w/w), or 0.1 to 15% (w/w), or 0.1 to 10% (w/w), or 0.1 to 9% (w/w), or 0.1 to 8% (w/w), or 0.1 to 7% (w/w), or 0.1 to 6% (w/w), or 0.1 to 5% (w/w), or 0.1 to 3% (w/w), or 0.1 to 2% (w/w), or 0.1 to 1% (w/w), or 0.1 to 0.5% (w/w), of fructose equivalents on a dry basis.

In some embodiments, said fructose equivalents are leucrose, fructose and/or sucrose. In some embodiments, said fructose equivalents are leucrose. In some embodiments, said fructose equivalents are fructose. In some embodiments, said fructose equivalents are sucrose. In some embodiments, said fructose equivalents are leucrose and fructose. In some embodiments, said fructose equivalents are leucrose and sucrose. In some embodiments, said fructose equivalents are fructose and sucrose. In some embodiments, said fructose equivalents are leucrose, fructose, and sucrose.

In one embodiment, the average molecular weight of the composition is greater than 2 kDa.

In one embodiment, the mean average molecular weight of the composition is between 2 to 14.58 kDa.

The glucose-based saccharides of the composition further comprise an α1-4 linkage at one end.

A typical composition of the invention comprises glucose-based saccharides having alternating α1-6 and α1-3 linkages; 1.5 to 2.5 grams of fructose equivalents per 33 grams of total carbohydrate; 30.5 to 31.5 grams of glucose-based carbohydrates per 33 grams of total carbohydrate, and wherein said glucose-based saccharides have an average degree of polymerization of between 12 to 13.

Another typical composition of the invention comprises glucose-based saccharides having alternating α1-6 and α1-3 linkages; 2.5 to 3.5 grams of fructose equivalents per 33 grams of total carbohydrate; 29.5 to 30.5 grams of glucose-based carbohydrates per 33 grams of total carbohydrate, and wherein said glucose-based saccharides have an average degree of polymerization of between 17 to 18.

Typically, the composition is fully caloric. In some embodiments, the composition provides at least 3 kcal per gram, or 3.5 kcal per gram, or up to 4 kcal per gram, or between 3.5 to 4 kcal per gram.

The composition induces a lower glycemic response in a subject compared with maltodextrin or glucose syrup. Typically, the glycemic response is lower in a subject in the 3 hour period immediately after intake of the composition. Glycemic response may be measured by incremental area under the curve (iAUC), for example as described herein.

The composition has the further advantage that it is digested slowly. Post-prandial hydrogen production can be used as an indirect measurement of digestibility. If non-digested carbohydrates reach the colon they are fermented by colonic bacteria. This fermentation produces gases, such as hydrogen and methane, which can be measured in the breath of a subject.

In one embodiment, the composition does not result in more than 20 ppm breath hydrogen in the 240 minute period immediately after intake of 33 grams of the composition by a subject. In one embodiment, 33 grams of the composition is digested more slowly than 33 grams of maltodextrin or glucose syrup.

Gastro-intestinal tolerance of the composition is very high. In one embodiment, the composition does not result in one or more of diarrhea, abdominal cramping, vomiting, audible bowel sounds, or flatulence in a subject in the 180 minute period immediately after intake of the composition, for example 33 g of the composition.

In some embodiments, the digestible carbohydrate composition according to the invention is for use in reducing glycemic response in a subject, preferably a human subject.

In one embodiment, said composition is for use in reducing glycemic response in a subject, wherein said composition comprises glucose-based saccharides having alternating α1-6 and α1-3 linkages; 2.5 to 3.5 grams of fructose equivalents per 33 grams of total carbohydrate; 29.5 to 30.5 grams of glucose based carbohydrates per 33 grams of total carbohydrate, and has an average DP of between 17 to 18.

In one embodiment, said composition is for use in reducing glycemic response in a subject in the 60 minute, 120 minute, or 180 minute period immediately after intake of the composition, as compared to the glycemic response to glucose syrup in the subject.

The glycemic response may be reduced by up to 45% in a subject in the 60 minute period immediately after intake. The glycemic response may be reduced by up to 38% in a subject in the 120 minute period immediately after intake. The glycemic response may be reduced by up to 33% in a subject in the 180 minute period immediately after intake.

Preferably, the subject is a human subject.

Food Product or Beverage

The invention also relates to a food product or beverage comprising the digestible carbohydrate composition as described herein. The digestible carbohydrate composition may be in the form of a powder, for example a ready to mix powder for a beverage. In other embodiment the digestible carbohydrate composition may be in the form of a liquid, e.g. a syrup.

Preferably, the beverage is a ready to drink (RTD) or heat treated beverage.

In some embodiments, said food product or beverage is a supplement.

In some embodiments, said food product or beverage is a nutritional product.

The nutritional product may be in any oral nutritional form, e.g. as a health drink, as a ready-made drink, optionally as a soft drink, including juices, milk-shake, yogurt drink, smoothie or soy-based drink, in a nutritional bar, or dispersed in foods of any sort, such as baked products, cereal bars, dairy bars, snack-foods, soups, breakfast cereals, muesli, candies, tabs, cookies, biscuits, crackers (such as rice crackers), and dairy products.

The nutritional product may be a nutritional bar.

The nutritional product may further comprise fat, protein, and other carbohydrate sources.

The supplement or nutritional product may be in the form of tablets, capsules, pastilles or a liquid, for example. The supplement or nutritional product may further contain protective hydrocolloids (such as gums, proteins, modified starches), binders, film forming agents, encapsulating agents/materials, wall/shell materials, matrix compounds, coatings, emulsifiers, surface active agents, solubilizing agents (oils, fats, waxes, lecithins or the like), adsorbents, carriers, fillers, co-compounds, dispersing agents, wetting agents, processing aids (solvents), flowing agents, taste masking agents, weighting agents, jellifying agents and gel forming agents.

In some embodiments, said nutritional product or supplement is for use as a medicament.

In some embodiments, said nutritional product or supplement is for managing glycemic control or reducing glycemic response in a human subject, for example in a healthy human subject.

In some embodiments, said nutritional product or supplement is for an infant, child or adolescent human subject.

In some embodiments, said nutritional product or supplement is for a diabetic and/or pre-diabetic human subject.

In some embodiments, said nutritional product or supplement is suitable for a human subject under acute care.

In some embodiments, said nutritional product or supplement is suitable for a weight loss product for a human subject.

In some embodiments, said food product is a pet food product.

Method of Reducing Postprandial Glucose

The invention also relates to a method of reducing postprandial glucose in a subject, comprising administering an effective amount of a digestible carbohydrate composition as described herein or a food product or beverage as described herein, to a subject in need thereof.

In some embodiments, said subject is a human subject.

In some embodiments, said subject is a companion animal subject, such as a cat or a dog.

Definitions

All percentages expressed herein are by dry weight by total dry weight of the composition unless expressed otherwise. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "a component" or "the component" includes two or more components.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified.

Digestible carbohydrate composition: a carbohydrate composition that is digested in the small intestine and does not reach the colon, thus does not lead to breath hydrogen production upon consumption by a subject, preferably a human subject.

Carbohydrate composition: all carbohydrates including digestible carbohydrates and sugars.

Glucose-based saccharides: carbohydrates of different sizes and molecular weights (MW) comprising glucose monomers as building blocks linked with α-glycosidic linkages.

Maltose unit: a disaccharide composed of two glucose units linked with an α1-4 glycosidic linkage.

Reducing end: The reducing end of a carbohydrate is the monosaccharide with a free anomeric carbon that is not involved in a glycosidic bond and is thus capable of converting to the open-chain form.

Fructose equivalents: any carbohydrate, including mono and di-saccharides, which is composed of at least one fructose monomer building block and contributes to fructose metabolism in the small intestine upon consumption by a subject, preferably a human subject. Examples are leucrose, sucrose and fructose.

Average degree of polymerization (DP): The average number of monosaccharide building blocks per chain of glucose-based saccharides in each carbohydrate composition.

Maltose-alternan-oligosaccharide (MAOS): an example of a glucose based saccharide with maltose at the reducing end.

Mono-saccharides: any class of simple sugars that can act as building blocks of larger carbohydrate structures. Simple sugars cannot be hydrolysed to give a simpler sugar. Examples of a simple sugar include glucose and fructose. Di-saccharides: any sugar whose molecules contain two monosaccharide building blocks, for example sucrose, leucrose and maltose.

Added sugar: all mono and di-saccharides described above present in the composition Glycemic response or postprandial glucose: the glucose concentration measured in the blood or interstitial tissue following the consumption of carbohydrates by a subject, preferably a human subject.

The terms "food," "food product" and "food composition" mean a product or composition that is intended for ingestion by an individual such as a human and provides at least one nutrient to the individual. As used herein, these terms encompass food in any form, including both liquid (e.g., a beverage) and solid. The compositions of the present disclosure, including the many embodiments described herein, can comprise, consist of, or consist essentially of the elements disclosed herein, as well as any additional or optional ingredients, components, or elements described herein or otherwise useful in a diet.

A "beverage" is a substantially homogenous liquid that is at least 85 wt. % water, in some embodiments at least 90 wt. % water or at least 95 wt. % water. A "ready-to-drink" beverage is in a liquid form that can be consumed without further addition of liquid and preferably is aseptic. Reconstitution and dilution can comprise addition of water and/or milk to the powder or concentrate respectively, and in some embodiments the method comprises a reconstitution or dilution step.

Those skilled in the art will understand that they can freely combine all features of the present invention disclosed herein. In particular, features described for the product of the present invention may be combined with the method of the present invention and vice versa. Further, features described for different embodiments of the present invention may be combined. Where known equivalents exist to specific features, such equivalents are incorporated as if specifically referred to in this specification.

Further advantages and features of the present invention are apparent from the figures and non-limiting examples.

EXAMPLES

Example 1

Production of Digestible Carbohydrate Composition

The prior art process is known for example from WO 0047727 A2 and WO 2009095278 A2, and comprises steps P1-P4 of FIG. 1a.

Figure 2A:
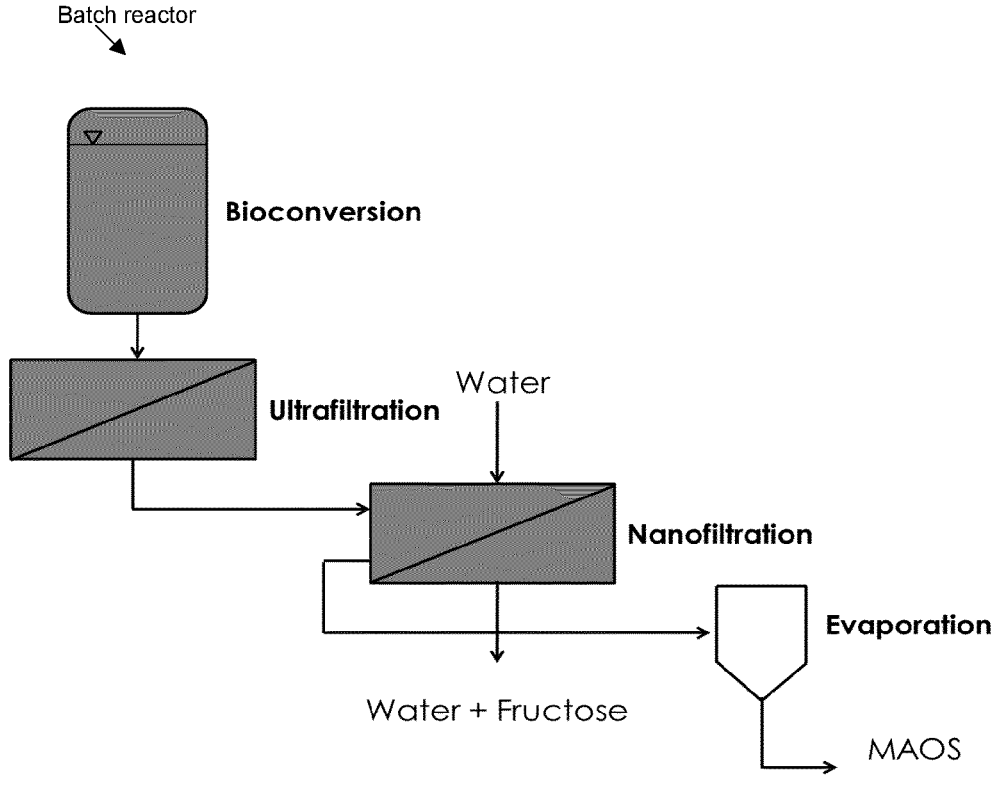
FIG. 2a shows a process design of the prior art process.

In step P1 bioconversion of sucrose and maltose is done in in batch reactor for a duration of about 20 h at T=37° C. The sucrose: maltose ratio is chosen to 7:1 (w/w or mol/mol). Step P1 is done in the batch reactor for bioconversion which is shown in FIG. 2a.

P2 is a step of ultrafiltration for removal of alternan-polymer (alternan polysaccharide) and alternansucrase enzyme (AlSu). This step is done in the ultrafiltration device shown in FIG. 2a.

In P3, fructose is removed by nanofiltration. This step is done in the nanofiltration device shown in FIG. 2a. Here, water is added and a mixture of water and fructose is removed.

In the final step P4 the product from P3 is concentrated by evaporation. This is done in the evaporation device in FIG. 2a and maltose-alternan oligosaccharide (MAOS) is obtained.

Figure 1B:
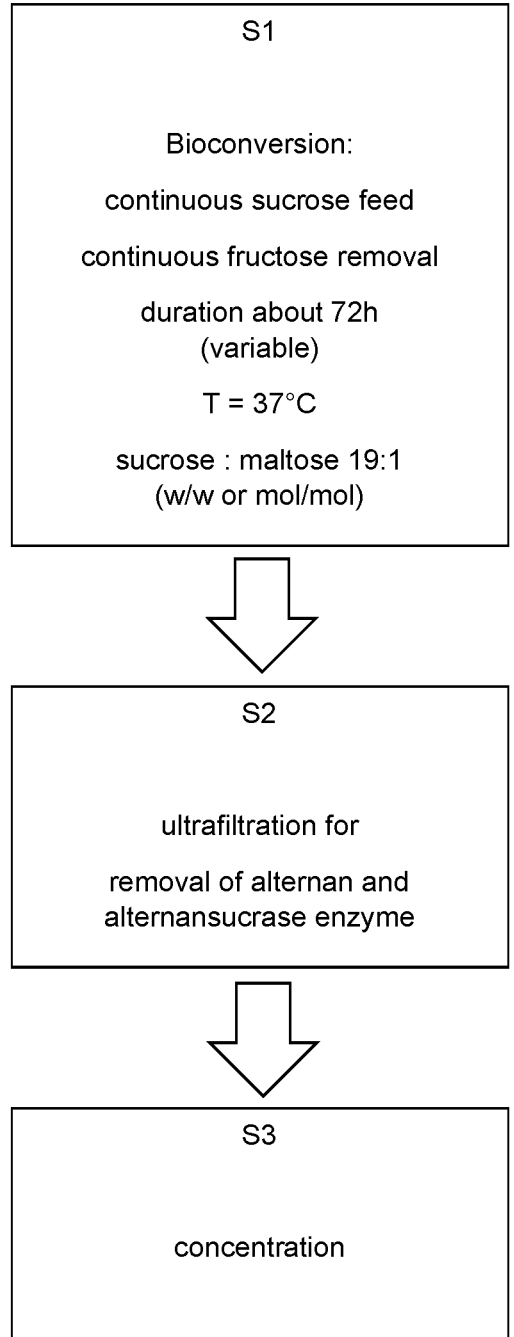
FIG. 1b shows a scheme of the process of making a digestible carbohydrate composition according to the invention.

The process of the invention, in a specific embodiment, comprises three steps S1-S3, shown in FIG. 1b.

In comparison to the prior art process of FIG. 1a, the bioconversion in step S1 comprises continuous feed of sucrose and continuous removal of fructose. Half-continuous feed and removal is possible. The mass ratio of sucrose (total amount added) to maltose is 19:1 (19 kg sucrose per 1 kg maltose) and the duration is about 72 h. Step P3 of the prior art can be omitted because fructose is removed in step S1 already. Removing fructose makes possible using a higher ratio of sucrose to maltose and reaching a higher degree of polymerization of the maltose-alternan-oligosaccharide.

Figure 2B:
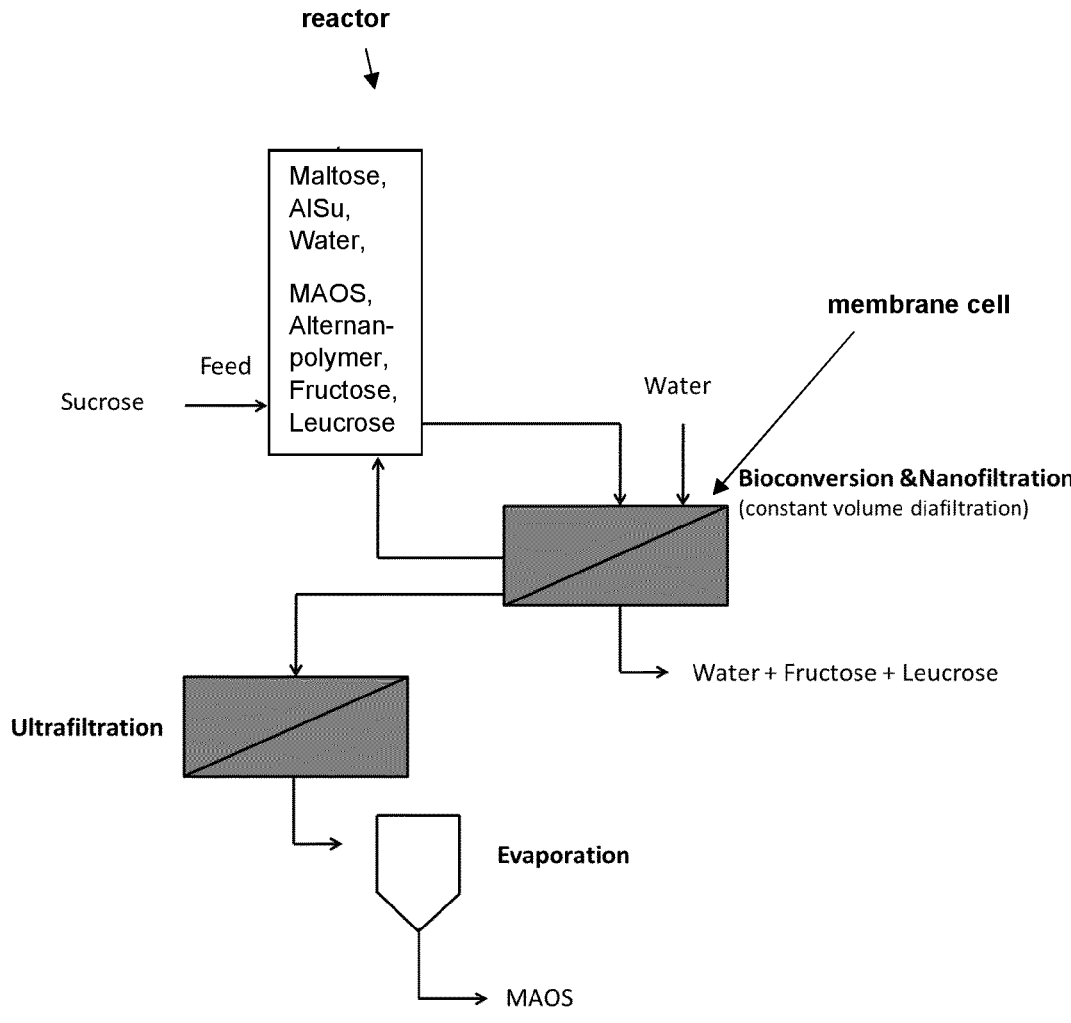
FIG. 2b shows a process design of the process of making a digestible carbohydrate composition according to the invention.

Step S1, a bioconversion is done in the reactor in FIG. 2b, wherein maltose and alternansucrase enzyme (AlSu) are present in water. A stated above, bioconversion is done with continuous feed of sucrose, continuous removal of fructose, for a duration about 72 h (variable), T=37° C., and a sucrose: maltose ratio of 19:1 (w/w or mol/mol). Sucrose is added as feed (dissolved in water) and the reactor content is stirred. In the bioconversion in the reactor, alternan oligosaccharide comprising acceptor molecule maltose, also called maltose alternan oligosaccharide (MAOS) is formed as main product and alternan polymer, fructose and leucrose are formed as by-products. Content from the reactor is continuously circulated through the membrane cell (diafiltration cell), where water, fructose and leucrose are removed in membrane filtration, which in this example is a nanofiltration, done as a constant volume diafiltration. Leucrose content is reduced from about 30% to less than 10%, in comparison with the prior art. Removed water is replaced by the water feed stream.

The reactor and the membrane cell form a combined bioconversion and nanofiltration device, also called reactor system.

Process step S2 of this embodiment corresponds to step P2 of the prior art. Here, alternan polysaccharide (alternan polymer), as by product, and alternansucrase enzyme (AlSu) are removed by ultrafiltration. The step is beneficial in case that more alternan polymer as desired has been formed, or in order to steer desired DPw of the alternan species remaining.

Process step S3 of this embodiment corresponds to step P4 of the prior art. Here the product is concentrated by evaporation.

The composition of the reaction solution used during the production is shown in Table 1. The 2.1 L solution gives a total of about 5.6 L with the water in the system (dead volume).

The process is run without depletion for the first hour to minimize potential loss of maltose across the membrane. Subsequently, fructose is constantly depleted via a nanofiltration membrane Filmtec NF270-2540 (DOW). Upon completion of the chain extension, the nanofiltration module was replaced with a TRISEP 2540-UE50-QXF ultrafiltration module (Microdyn Nadir). This separated the maltose-alternan oligosaccharide (MAOS) fraction from the longer aging chains and the enzyme. The membranes used during the process and process parameters used are summarized in Table 2. The filtrate was finally concentrated to a dry matter content of >72%.

TABLE 1

Composition of the reaction solution

| Component | Amount | feed rate |
|---|---|---|
| Maltose | 451 g | Batch |
| Sucrose | 8500 g | ~100 g/h |
| sodium acetate | 57 g | Batch |
| Alternansucrase | 1900 U | Batch |
| Water | ad 2.1 L | Batch |

TABLE 2 membranes and parameters

| process step | filter | pressure | Temperature |
|---|---|---|---|
| nanofiltration | Filmtec NF270-2540 (DOW) | 5-30 bar, actually used 15 bar | 30-40° C., actually used 37° C. |
| ultrafiltration | TRISEP 2540-UE50-QXF (Microdyn Nadir) | 2-15 bar, actually used 10 bar | 30-60° C., actually used 40° C. |

Figure 3:
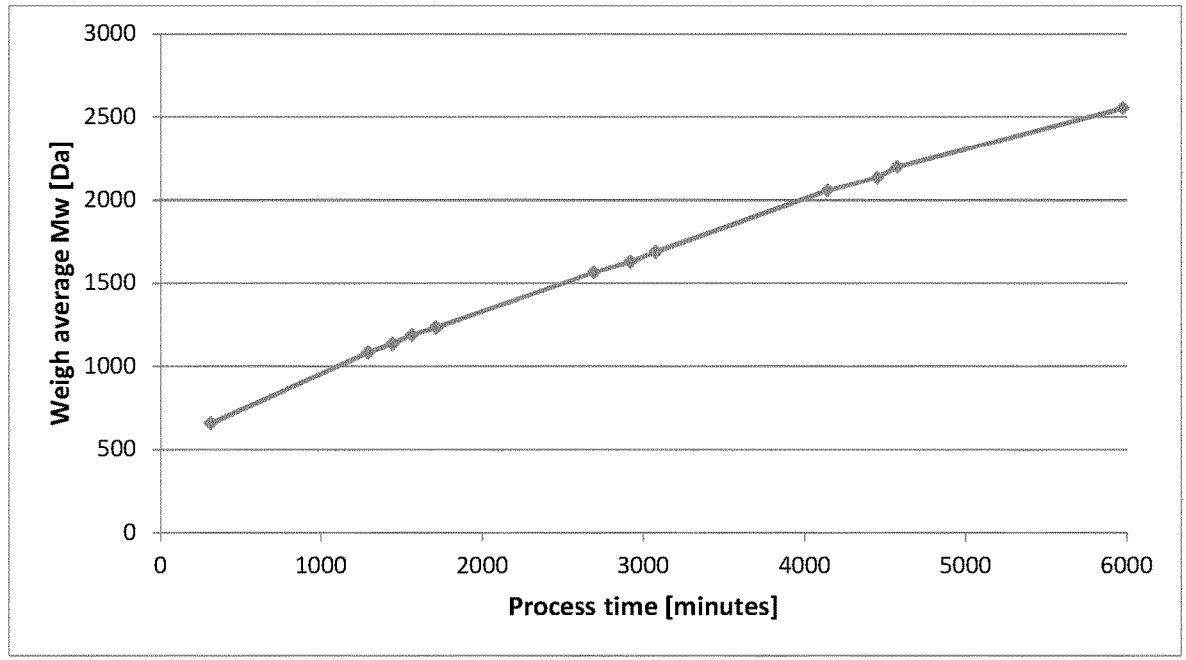
FIG. 3 is a chart showing the increase of molecular weight over the process time when constant feed of sucrose is applied.

FIG. 3 shows the increase in chain length over the course of the process. The values were recorded by GPC-RI measurements. The relationship for calculation of DPw from the Mw values of FIG. 3 is as follows: DPw=Mw/(162 Da). So it can be seen that at the end of the process, a DPw of about 15.4 is reached (2500/162).

In order to reach an average chain length DPw of about 15, 19 kg of sucrose (in total) were used per 1 kg of maltose.

Comparative example: Alternan-oligosaccharide was made according to a process as shown in FIG. 1a. A ratio of 21:1 (kg Sucrose: kg Maltose) was used and DPw of 9.9 was obtained. For the measurement of DPw, GPC-RI was used, but not exactly according to the method-protocol as mentioned above. Nevertheless, in comparison with the results of FIG. 3 it is shown that by the present invention alternan with higher DPw can be obtained.

DPw values for two samples obtained by the method of the invention that were analyzed with HPAEC-PAD method are summarized in table 4.

Example 2

Structural Characterization of Digestible Carbohydrate Composition Prepared According to Example 1

Simple sugars (glucose, fructose, leucrose, sucrose, maltose) were quantified using a Dionex ICS-3000 DC apparatus equipped with an HPLC carbohydrate column (CarboPac PA1 column, 4×250 mm, no guard at 30° C.), inert styrene divinyl benzene polymer (Dionex Corporation, 2010) and gold triple potential pulsed amperometric detection (PAD). Eluent A (300 mM aqueous NaOH), eluent B (MiliQ water) and eluent C (CH3COONa 500 mM in NaOH 150 mM) were used as the mobile phase in a gradient mode, with a total run of 35 mins.

The simple sugars present in the tested products on dry basis are summarized in the Table 3 below:

| Tested product | Glucose | Fructose | Leucrose | Maltose | Sucrose |
|---|---|---|---|---|---|
| DCC-1 | 0.0 | 1.2 | 12.2 | 1.6 | 0.3 |
| DCC-2 P1 | 0.0 | 0.1 | 12.1 | 0.0 | 0.0 |
| DCC-3 P2 | 1.5 | 2.8 | 11.2 | 0.0 | 0.0 |

Values for DPw were measured by HPAEC-PAD after reducing and hydrolyzing glucose-based saccharides. Two milliliters of a solution containing 6 g/mL of digestible carbohydrate composition were treated with 0.2 mL of a $NaBH_4$ solution (40 mg/mL) in 0.5 M ammonia at 40° C. for 30 min. Reduced samples were subsequently hydrolyzed with 0.5 mL 2 M Trifluoroacetic acid heated at 121° C. for 1 h to release monomers. The released monomers were quantified by injecting sample solutions on a Thermo Scientific™ Dionex™ ICS-6000 ion chromatograph system equipped with a CarboPac™ MA1 and fed with eluents (water and NaOH 1000 mM) at 0.4 mL/min. DP values are calculated with the following formula:

$$DP = \frac{\left(\frac{\text{sugar alcohols}}{182}\right) + \left(\frac{\text{glucose content}}{180}\right)}{\left(\frac{\text{sugar alcohols}}{182}\right)}$$

DP values for samples are summarized in the table 4 below:

| Tested Product | Avg DP (DPw) |
|---|---|
| Comparative Sample DCC-1 | 6.9 ± 0.02 |
| DCC-2 P1 | 12.4 ± 0.24 |
| DCC-3 P2 | 17.3 ± 0.53 |

Figure 4:
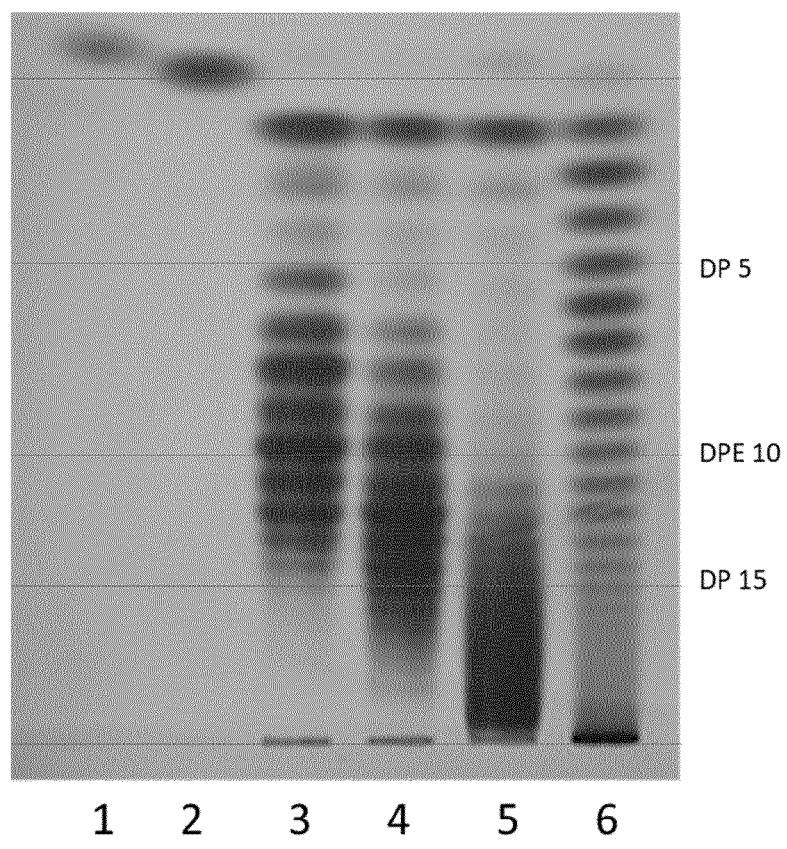
FIG. 4: 1: fructose; 2: glucose; 3: DCC-1; 4: DCC-2 P1; 5: DCC-3 P2; 6: maltodextrin standards of different degrees of polymerization (DP).

The MW of DCC-1, DCC-2 P1 and DCC-3 P2 were also analysed quantitatively using Thin Layer Chromatography, using a silica TLC plate, a mixture of chloroform:acetic acid:water:ethanol (30:35:25:20) as mobile phase and the diphenylamine-aniline reagent as a visualization agent (FIG. 4).

Glycosidic linkage profiles for glucose-based oligosaccharides were measured with partially-methylated alditol acetates by GC-MS. Briefly, samples were dissolved in anhydrous DMSO, deprotonated by an addition n-Butyl Lithium (Sigma 230707) and methylated with Methyl iodide (Sigma 289566). The methylated samples were subsequently hydrolyzed with 2 N TFA (60 min at 121° C.). The hydrolyzed samples were evaporated under a nitrogen air draft, re-dissolved in 1 M ammonium hydroxide and alde-
hyde groups were reduced with a DMSO solution containing
sodium borodeuteride (20 mg/ml). Glacial acetic acid was
added drop wise to stop reaction and acetylation was done
by addition of 1-methylimidazole and acetic anhydride.
Partially methylated alditol acetates in acetone were quan-
tified by GC-MS (7890A-5975C MSD, Agilent Technolo-
gies, Inc., Santa Clara, CA, USA) using a Supelco 24111-U
SP-2380 capillary column (injector volume, 0.5 µl; injector
temperature, 250° C.; detector temperature, 250° C.; carrier
gas, helium: 30 mL/min; split ratio, 40:1; temperature pro-
gram, 100° C. for 3 min, 4° C./min to 270° C. for 20 min.
Electron impact spectra were acquired at 69.9 eV over
50-550 Da mass range.

TABLE 5

| Glycosydic-linkage | DCC-1 | DCC-2 | DCC-3 |
| --- | --- | --- | --- |
| Terminal-Glc | 36 | 31.5 | 29.3 |
| 1,3-D-Glc | 13 | 15.2 | 16.8 |
| 1,6-D-Glc | 39 | 44.1 | 44.3 |
| 1,4-D-Glc | 11 | 6.8 | 5.0 |
| 1,3,6-D-Glc | 1.4 | 2.4 | 4.7 |

Higher values of 1,6-glycosidic linkages are explained by
the leucrose content in the digestible carbohydrate compo-
sitions that contributes to the amounts of 1,5,6-Tri-O-acetyl-
1-deuterio-2,3,4-tri-O-methyl-D-glucitol observed. In addi-
tion, leucrose, as well as monomeric glucose, contributes to
the amounts of terminal-Glc in the digestible carbohydrate
compositions.

Example 3

Production of Digestible Carbohydrate Composition

In this example, parameters of the process described in
Example 1 for DCC-3 were varied as shown in the following
table and alternansucrase was given to the reactor in 4 equal
portions, the first portion being present before sucrose was
fed to the reactor.

Sucrose amount: 16.5 kg
Sucrose feeding rate: 775 g/h
Enzyme activity: 79.2 kU
Temperature: 43° C.
Time: 27 h
Enzyme activity means the total units of alternansucrase
enzyme used in the process.

Reaction time of the process of the invention (not includ-
ing here further process steps like removing alternan-poly-
saccharide and alternansucrase enzyme by a further mem-
brane filtration, or concentrating a retentate which is
obtained in the further membrane filtration) could be
reduced by increasing the sucrose amount, increasing the
sucrose feeding rate, increasing the enzyme activity and
increasing the temperature.

Glycosidic linkage profiles for glucose-based oligosac-
charides were measured as per Example 2. Results are
shown in Table 6 below:

TABLE 6

| Glycosydic-linkage | % |
| --- | --- |
| Terminal-Glc | 23.1 |
| 1,3-D-Glc | 17.4 |
| 1,6-D-Glc | 46.0 |

TABLE 6-continued

| Glycosydic-linkage | % |
| --- | --- |
| 1,4-D-Glc | 5.5 |
| 1,3,6-D-Glc | 7.0 |

Example 4

Preliminary Crossover Study Results

Figure 6:
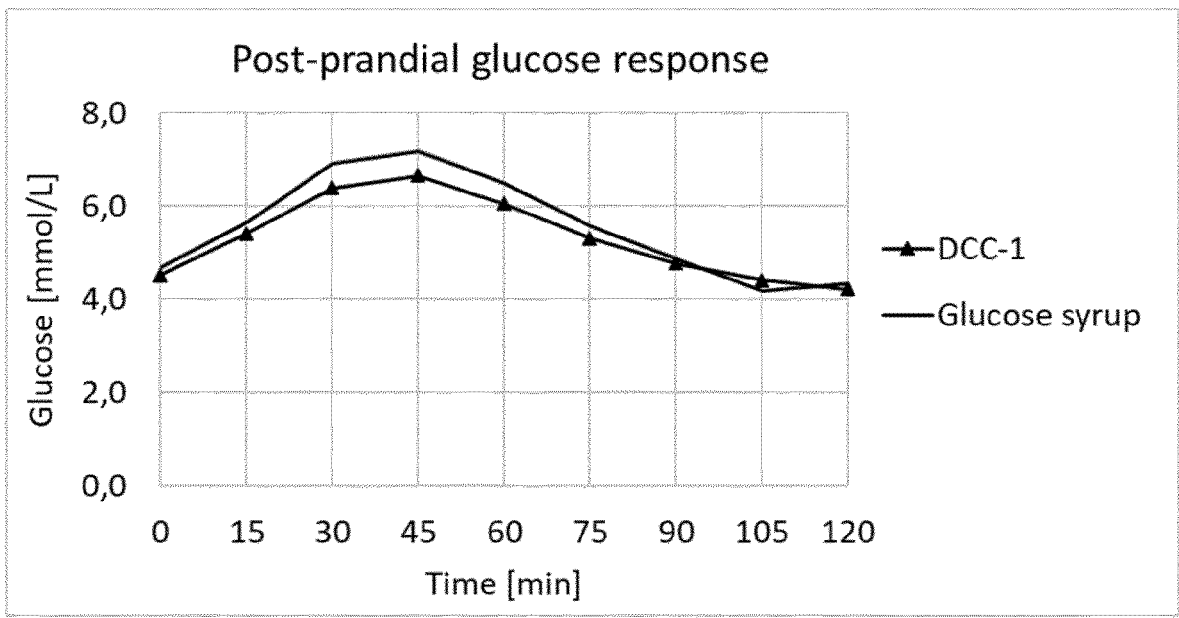
FIG. 6. Post-prandial glucose response following the consumption of DCC-1 and glucose syrup, for a total of 25 g carbohydrates.
Figure 7:
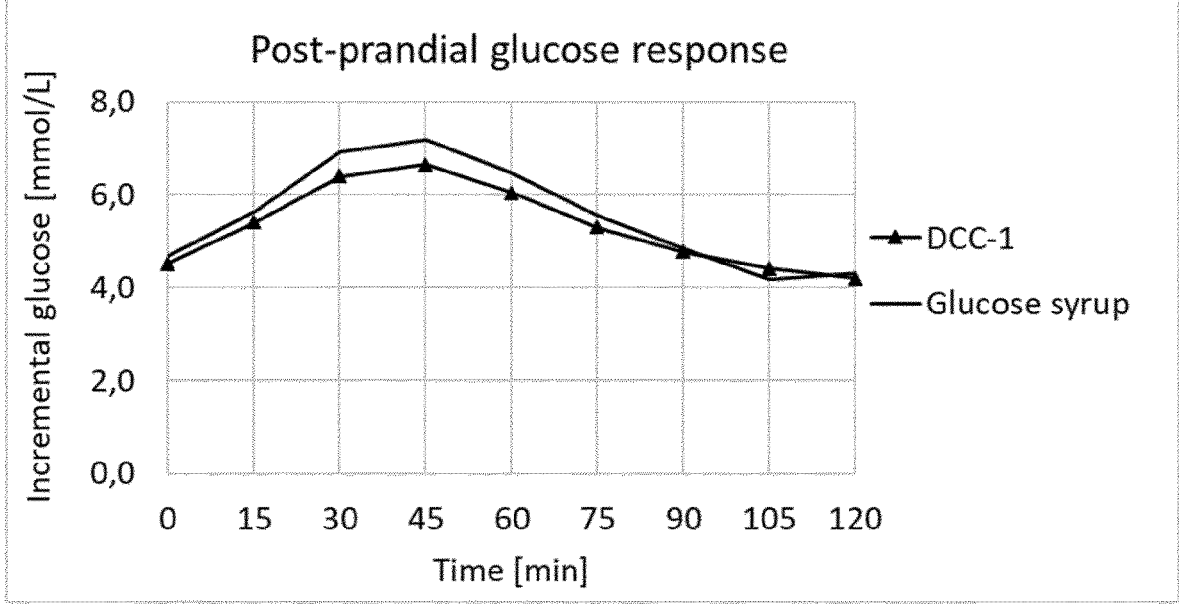
FIG. 7. Incremental post-prandial glucose response following the consumption of DCC-1 and glucose syrup for a total of 25 g carbohydrates.

In a previous randomized, controlled, crossover study, a
digestible carbohydrate composition with a degree of
polymerization of 7 (DCC-1) was tested in 16 healthy
volunteers. 25 g of the DCC-1 dissolved in 300 mL of water
were ingested and post-prandial glucose response was mea-
sured during two hours (FIG. 6 and FIG. 7). As a control, 25
g of glucose syrup were consumed.

In this study, the consumption of DCC-1 led to a lower
glycemic response as compared to glucose syrup, however,
the differences for tmax, iCmax and iAUC were not signifi-
cant. Moreover, no major gastrointestinal discomfort was
reported by the study participants. These results suggest that
the α-glucan consumed is largely digested but the modest
increase of degree of polymerization (DP of 7), as compared
to glucose syrup, does not allow to obtain significant benefits
towards glycemic response.

Example 5

Clinical Trial Methodology

This was a monocentric, controlled, randomized, double-
blind, crossover study where 16 participants consumed
different test products containing different types of carbo-
hydrates differing in their structure and composition. Sub-
jects' participation in this research project was voluntary and
they could end their participation at any time without having
to justify the withdrawal of their consent or any termination
of their participation. If they withdrew, coded data that was
already collected up to that point was used and was anony-
mized after analyses.

The aim of this study was to test the effect of different
α-glucans on post-prandial glucose response (PPGR) and
hydrogen (H2) production to provide insight into their
digestibility.

The primary objective was to determine if the α-glucans
tested induce a lower glucose response as compared with
maltodextrin.

The secondary objective was to determine indirectly if the
α-glucans tested are fully absorbed in the small intestine and
induce gastrointestinal discomfort.

Glucose response was assessed during 3 hours after intake
of the experimental product. The 3 h incremental area under
the curve (3 h-iAUC) was the primary endpoint to address
the primary objective.

As secondary endpoints, the following parameters were
analyzed:

Other parameters derived from PPGR (i.e. cross-sectional
values, iCmax, Cmax, tmax, partial iAUCs, AUCs);

Digestibility by measuring breath H2 during the 4 hours
following test product ingestion. Parameters derived
from these H2-curves were 4 h-iAUC, partial iAUC,
partial AUC, Cmax and cross-sectional values. All
these values were derived from H2-data corrected for
CO2. Similar parameters were derived from H2-data
not corrected for CO2, as well as from CH4-data (both
with and without CO2 correction);

Gastro-intestinal tolerance 3 h after the product intake with a visual analogue scale for each symptom of interest: 1) Diarrhea, 2) Abdominal cramping, 3) Vomiting, 4) Audible bowel sounds, 5) Flatulence or Gas.

The glycaemia was measured using a flash glucose monitoring (FGM, Free Style Libre®, Abbott) device, which is a sensor with minimal invasiveness for real-time monitoring of body glucose levels in interstitial fluids. The FGM has been developed and validated for use in adults with type 1 or type 2 diabetes [1-4] and measures interstitial glucose every 15 minutes for 14 days.

Hydrogen breath testing is widely used for detection of carbohydrate malabsorption. Its principle relies on the detection of hydrogen in the exhaled air resulting from bacterial fermentation of carbohydrates mainly in the colon. To obtain rapid and reliable indirect information on carbohydrate absorption, a breath analyser (Lactotest 202, M.E.C Belgium) measuring $H_2$ was used in this study.

The test products were α-glucans with varying degrees of polymerization (DP) and glycemic linkages, and therefore different degrees of digestibility. Digestible carbohydrate composition 2 (DCC-2) has a DP of 12.4 and digestible carbohydrate composition 3 (DCC-3) has a DP of 17.3. As a reference, a fully digestible and fully caloric maltodextrin (glucose syrup) was administered. 33 g of total carbohydrates were contained in the test products, either in the form of powder (glucose syrup) or syrup (digestible carbohydrate composition). On the day before the test visits, the test products were dissolved in 300 mL of water and stored overnight at 4° C. On the morning before consumption, the beverages were heated up to room temperature and served to the participants The target population was completely healthy males and females (based on anamnesis) aged between 18 and 45 years with a BMI between 20 and 29.9 kg/m2. The subjects were not eligible for participation if they presented one or several of the following exclusion criteria:

Pregnant or lactating women;

Any concomitant medication potentially interfering with study procedures and assessment, such as antibiotics, antiacids, or other medications impacting transit time, colonoscopy, irrigoscopy or other bowel cleansing procedures four weeks prior the test;

Major medical/surgical event in the last 3 months potentially interfering with study procedures and assessments;

Abnormal bowel transit and history of chronic constipation with passage of fewer than 3 spontaneous bowel movements per week on average or chronic or recurrent diarrhea with spontaneous bowel movements more often than 3 times daily;

Known food allergy and intolerance to test product;

Medically known cutaneous hypersensitivity to adhesives and plasters;

Alcohol intake higher than 2 servings per day. A serving is 0.4 dl of strong alcohols, 1 dl of red or white wine, or 3 dl of beer;

Smokers;

Volunteers who cannot be expected to comply with the protocol;

Subject having a hierarchical link with the research team members.

Potential candidates were contacted using adverts sent out within Nestlé entities. Interested and eligible volunteers were given a full oral information session (V0) by the research team on the research objectives, methodology, as well as its possible risks/inconveniences. Candidates were invited for a medical screening visit to ensure their eligibility and for signature of the informed consent.

At least 24 hours before the intake of the first test product, one FGM device was inserted into the non-dominant arm of each volunteer. Then, the participants attended a different test visit for each of the beverage, separated by at least one day to allow a low fibre diet on the day preceding each test visit. The sensor was removed on the last day of test, after completion of all measurements.

On the day before each test visit, the subjects were required to refrain from consuming alcohol. There were asked not to take any medication like aspirin or supplement containing Vitamin C that may affect FGM measurements, and promotility drugs, laxatives and antibiotics four weeks prior the test and during the whole study. Fermentable foods such as complex carbohydrates had to be avoided on the day prior to breath testing. The last meal on the day preceding the test had to be not too ample and not contain any dietary fibres. Participants were also asked to avoid intake of chewing gums from 8pm the day before each test visit.

Figure 5:
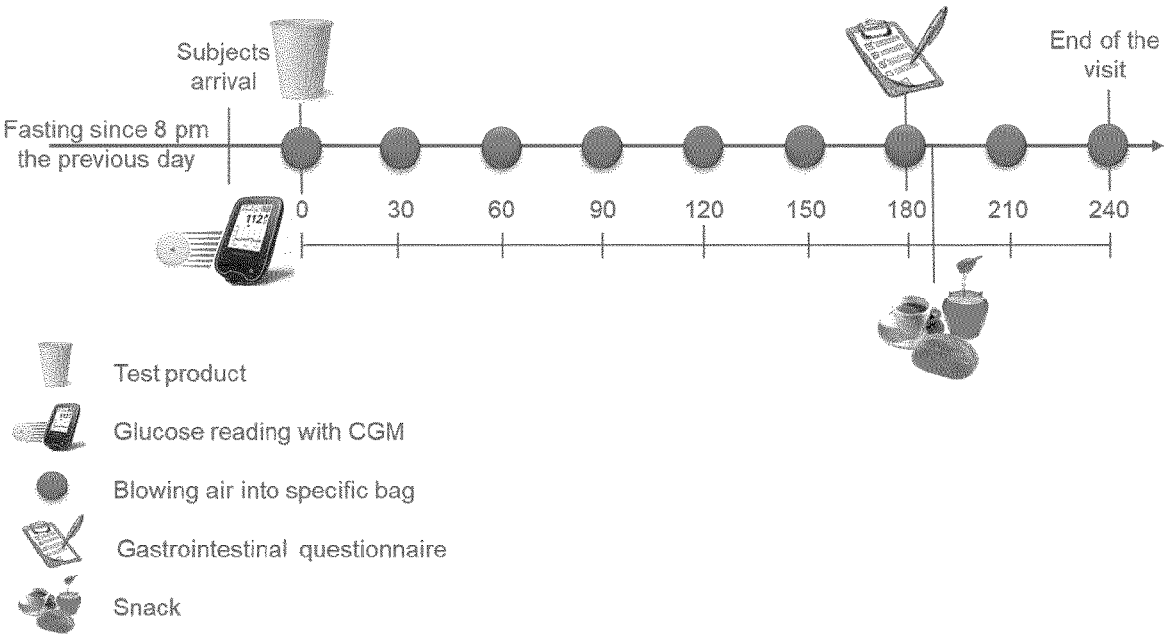
FIG. 5. General study scheme.

The general study scheme is described in FIG. 5. At each test visit, the subjects arrived at the metabolic unit at 8 am, fasting since 8 pm the previous day. To minimize interferences with breath testing, the subjects were required to avoid chewing gums and wearing perfume and were asked to brush their teeth thoroughly at home before each visit at the metabolic unit.

Readings from the FGM device were taken before and after product intake. Mean of the two measures were considered as baseline value. Readings were also performed at 30, 60, 90, 120, 150, 180, 210 and 240 minutes. Breath samples to measure the production of hydrogen were taken before product intake, then at 30, 60, 90, 120, 150, 180, 210 and 240 minutes, just after glucose reading. 180 minutes after product intake and once the corresponding glucose reading and breath test were completed, the subjects were asked to fill in a questionnaire about gastrointestinal symptoms. Following these procedures, a breakfast without fibres composed of white bread, honey and coffee or tea or water was served. Any other food, including chewing gums, were prohibited during the test period and only water was allowed.

A minimal sample size of N=10 subjects completing a study is required by 150-26642 for determining the glycemic index (GI) of food products and to classify them [5]. In the case of α-glucans, the study 17.08.BIO has shown that N=16 is required to detect a reduction of 35% in PPGR 3 h-iAUC vs. maltodextrin control (SD=50%) with α=5% (two-sided) and power=80%. Since this previous study used a smaller serving size (i.e. 25 g), the calculated sample size is conservative (i.e. variability in healthy subjects is generally reduced with higher servings). This sample size is also appropriate for the $H_2$-related endpoints as shown by the fact that N=16 allows to differentiate a difference of 0.35 log ppm with α=5%, power=80% [6]. As a conclusion, the sample size for this study was N=16.

For the primary endpoint (i.e. 3 h-iAUC derived from PPGR), the test products were compared to the maltodextrin control using paired t-tests (following the logic of ISO-26642). In order to control the False Discovery Rate (FDR) at α=5%, the Benjamini-Hochberg procedure [7] was applied. A sensitivity analysis was performed by using a mixed model to take into account potential systematic position or carry-over effects [8]. For all other pairwise comparisons and all other endpoints, the analyses were the same but without any correction for multiplicity.

Example 6

Results of Clinical Trial 16 healthy volunteers, 6 females and 10 males, with a mean age of $31.4\pm5.9$ years, a mean BMI of $23.0\pm1.6$ kg/m2 and a mean fasting glycaemia of $4.8\pm0.5$ mmol/L were recruited.

Figure 8:
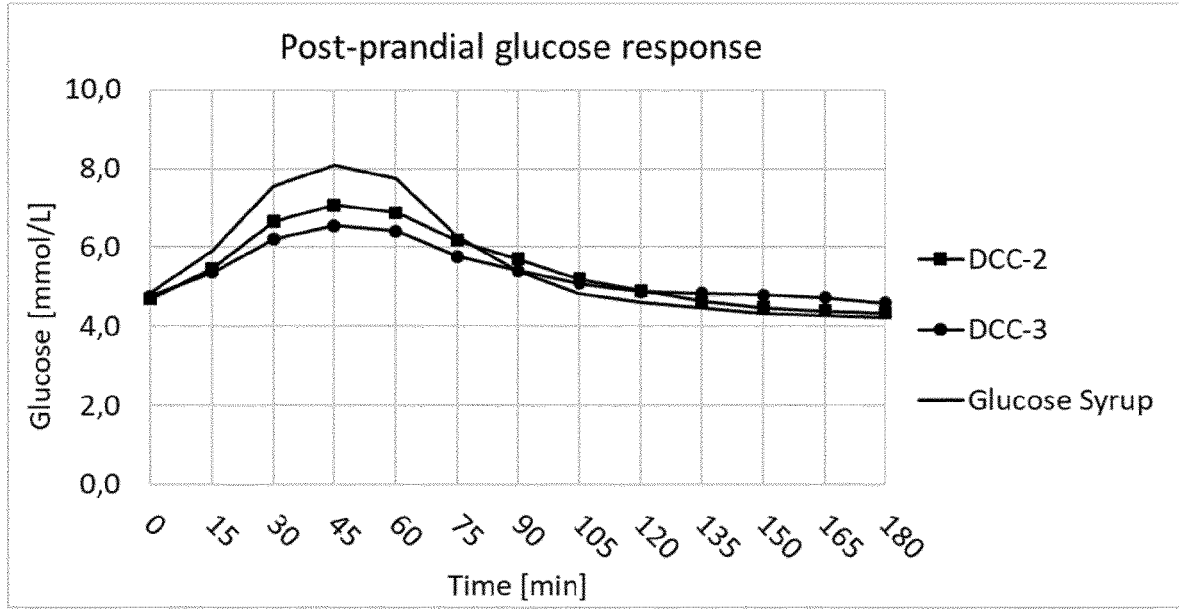
FIG. 8. Post-prandial glucose response following the consumption of DCC-2, DCC-3 and glucose syrup for a total of 33 g carbohydrates.
Figure 9:
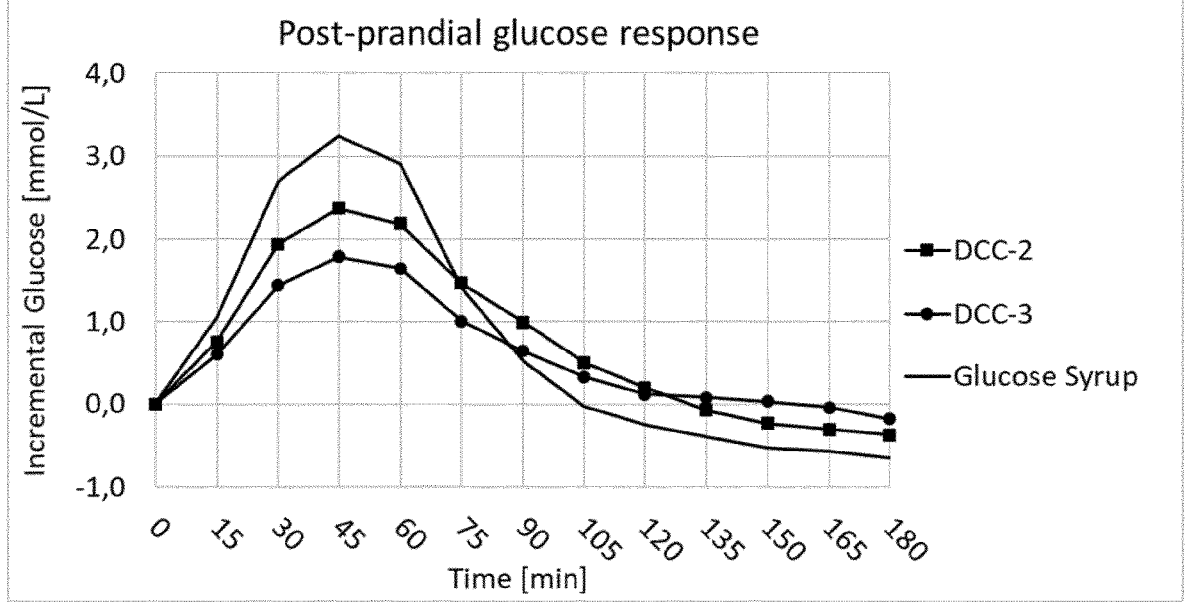
FIG. 9. Incremental post-prandial glucose response following the consumption of DCC-2, DCC-3 and glucose syrup for a total of 33 g carbohydrates.

FIG. 8 and FIG. 9 illustrate the 4 h-post-prandial glucose and incremental glucose responses, respectively, of all test products. As compared to glucose syrup, both glucose-based saccharides led to significantly lower iCmax but no significant difference is observed for tmax. The time required for the glycaemia to return to baseline values is not significantly longer compared to the reference. While 1 h-iAUC is significantly lower for both test products, only DCC-3 led to significantly lower 2 h- and 3 h-iAUC, as compared to the glucose syrup.

When comparing the glucose curve shape of the α-glucans to the reference, it is observed that for both α-glucans the peak of glucose is lower and the return to baseline slower. The decrease of glycaemia after the peak is less rapid than the reference and the glycaemia remains slightly higher for a longer period of time, suggesting that the α-glucans might be digested and utilized slightly more slowly than the maltodextrin. Moreover, the consumption of α-glucans leads to less hypoglycemia after return to baseline compared to the control.

Figure 10:
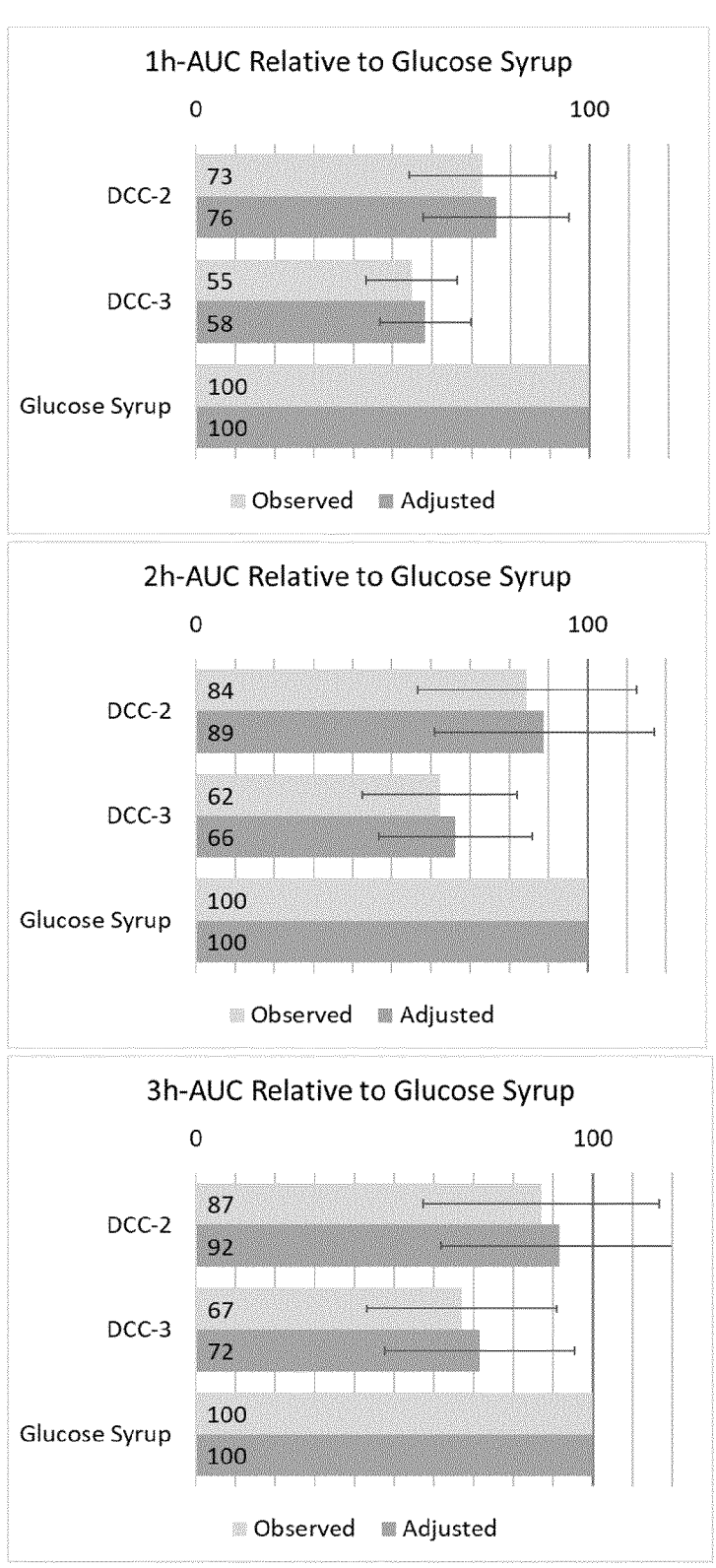
FIG. 10. Mean relative iAUCs of DCC-2 and DCC-3 vs glucose syrup and in dark grey the predicted relative iAUCs if a product was pure glucose with no fructose equivalent. If the error bar does not cross the 100%-line, the difference vs. the reference is significant ($p < 0.05$).

In FIG. 10 are represented the mean relative 1 h-, 2 h- and 3 h-iAUC of the test products compared to the glucose syrup. DCC-2 lead to 27% (p<0.05), 16% and 13% reduction of 1 h-, 2 h- and 3 h-iAUC, respectively, compared to the reference. DCC-3, with a higher degree of polymerization than DCC-2, led to greater glycemic reductions as compared to the reference: 45% for 1 h-iAUC (p<0.05), 38% for 2 h-iAUC (p<0.05) and 33% for 3 h-iAUC (p<0.05).

DCC-2 and -3 contain 2.1 and 2.9 g of fructose equivalent, respectively, and are therefore not fully glucose-based, unlike the glucose syrup. The dark grey bars of FIG. 10 are the adjusted data for the predicted relative iAUC if the product was pure glucose-based. Once adjusted the reduction of iAUC for DCC-2 remains significant only for the 1 h-iAUC (24%), while for DCC-3 1 h-, 2 h- and 3 h-iAUC reductions are significant (42%, 34% and 28% respectively). Even with the adjusted predictions, the reductions of glycaemia remain significant and it can be concluded that this is not the fructose being the main driver of PPGR reduction.

Figure 11:
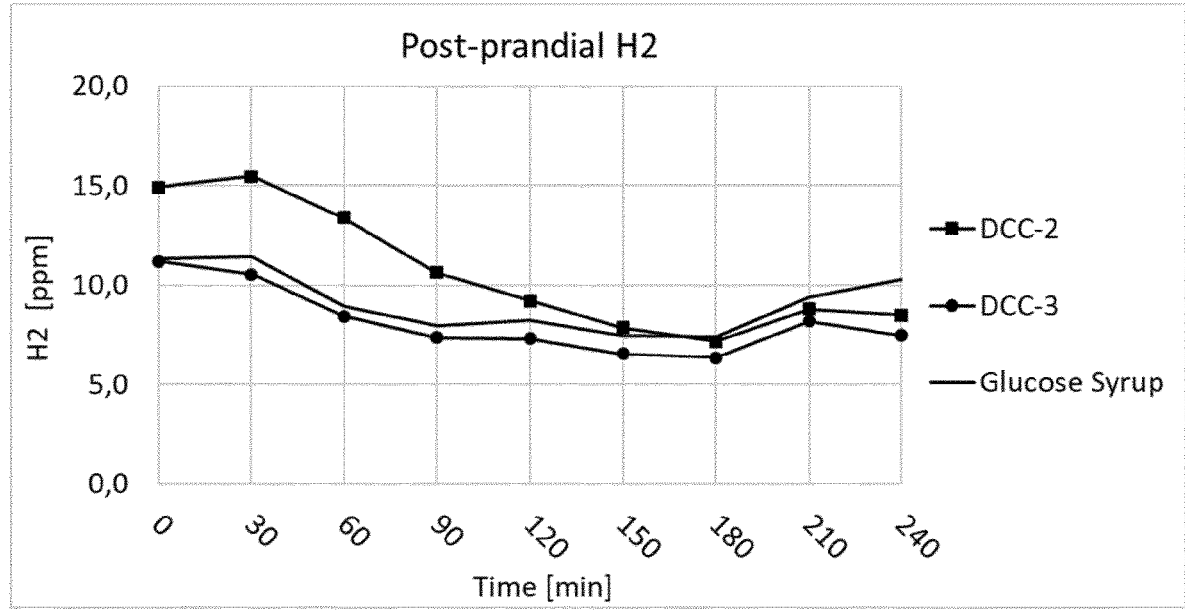
FIG. 11. Post-prandial breath hydrogen production following the consumption of DCC-2, DCC-3 and glucose syrup.
Figure 12:
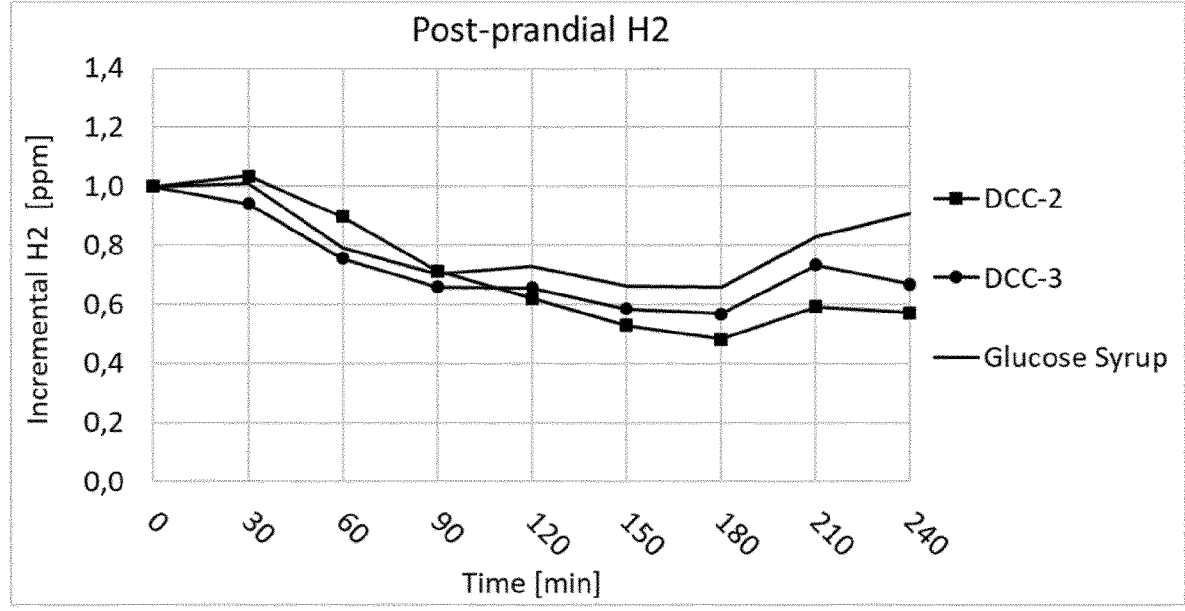
FIG. 12. Incremental post-prandial breath hydrogen production following the consumption of DCC-2, DCC-3 and glucose syrup.

Post-prandial breath H2 was used as an indirect measurement of products digestibility. If non-digested carbohydrates reach the colon they are be fermented by colonic bacteria. This fermentation produces gases, such as H2 and CH4, which can be measured in the breath. Following consumption of the test products, no significant difference between each other was observed and, as well as no significant difference relative to the fully digestible control product (FIG. 11 and FIG. 12). The common range for fasting breath hydrogen is $7\pm3$ ppm and most values during 240 minutes are found within this range. Only DCC-2 has higher values than the other products, but they remain under the carbohydrate malabsorption threshold of 20 ppm and decrease throughout the test to reach levels similar to the others. A small increase of hydrogen production is observed at 180 min, after breakfast consumption, suggesting that the lactotest is detecting even small amounts of H2, which can come from the presence of very small amounts of complex carbohydrates or a slightly incomplete absorption of simple carbohydrates (e.g. fructose). Therefore, all α-glucans seem to be largely digestible and do not induce carbohydrate fermentation like fibres.

The gastrointestinal tolerance to the products was assessed using a visual analogue scale for five different symptoms: abdominal cramping, bowel sounds, diarrhea, flatulence and vomiting (Table 6). Generally, few people reported discomfort and no severe event was reported. Indeed, bowel sounds was the symptom with the highest scores. From the people reporting discomfort, the score was usually low. The mean z-scores remain low and are the highest for the glucose syrup, which is the reference product. Therefore, in healthy subjects, the gastrointestinal tolerance to α-glucans seems good and suggests that it is largely digestible.

TABLE 6

Scores per subject for each gastrointestinal symptom and product.
GS: glucose syrup.

| Subject | Abd. Cramping | | | Bowel Sounds | | | Diarrhea | | | Flatulence | | | Vomiting | | |
|---|---|---|---|---|---|---|---|---|---|---|---|---|---|---|---|
| | DCC-2 | DCC-3 | GS | DCC-2 | DCC-3 | GS | DCC-2 | DCC-3 | GS | DCC-2 | DCC-3 | GS | DCC-2 | DCC-3 | GS |
| 1 | 0 | 26 | 23 | 0 | 0 | 0 | 0 | 0 | 0 | 32 | 24 | 30 | 1 | 0 | 0 |
| 2 | 0 | 0 | 0 | 0 | 9 | 0 | 0 | 0 | 0 | 0 | 1 | 0 | 0 | 0 | 0 |
| 3 | 18 | 7 | 10 | 0 | 0 | 0 | 0 | 0 | 0 | 0 | 0 | 0 | 0 | 0 | 0 |
| 4 | 1 | 0 | 0 | 2 | 0 | 0 | 2 | 0 | 0 | 12 | 0 | 0 | 1 | 0 | 1 |
| 5 | 3 | 2 | 0 | 48 | 12 | 75 | 2 | 0 | 2 | 2 | 1 | 0 | 0 | 3 | 1 |
| 6 | 0 | 0 | 0 | 17 | 21 | 51 | 0 | 0 | 0 | 0 | 0 | 1 | 0 | 0 | 0 |
| 7 | 0 | 0 | 0 | 0 | 0 | 22 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 |
| 10 | 0 | 0 | 5 | 0 | 0 | 15 | 0 | 0 | 0 | 0 | 0 | 4 | 0 | 0 | 0 |
| 11 | 0 | 0 | 0 | 0 | 0 | 0 | 0 | 0 | 0 | 0 | 0 | 0 | 0 | 0 | 0 |
| 12 | 0 | | 0 | 0 | | 3 | 0 | | 4 | 0 | | 2 | 0 | | 0 |
| 13 | 0 | 0 | 2 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 |
| 15 | 0 | 0 | | 0 | 0 | 0 | 0 | 0 | 0 | 0 | 0 | 0 | 0 | 0 | 0 |
| 16 | 0 | 8 | 0 | 0 | 0 | 0 | 0 | 14 | 0 | 0 | 21 | 21 | 0 | 9 | 15 |
| Max | 18 | 26 | 23 | 48 | 21 | 75 | 2 | 14 | 4 | 32 | 24 | 30 | 1 | 9 | 15 |
| Median | 0 | 0 | 0 | 0 | 0 | 0 | 0 | 0 | 0 | 0 | 0 | 0 | 0 | 0 | 0 |
| Min | 0 | 0 | 0 | 0 | 0 | 0 | 0 | 0 | 0 | 0 | 0 | 0 | 0 | 0 | 0 |

TABLE 6-continued

Scores per subject for each gastrointestinal symptom and product.
GS: glucose syrup.

| | Abd. Cramping | | | Bowel Sounds | | | Diarrhea | | | Flatulence | | | Vomiting | | |
|---|---|---|---|---|---|---|---|---|---|---|---|---|---|---|---|
| Subject | DCC-2 | DCC-3 | GS | DCC-2 | DCC-3 | GS | DCC-2 | DCC-3 | GS | DCC-2 | DCC-3 | GS | DCC-2 | DCC-3 | GS |
| Subjects with value > 0 [%] | 19 | 27 | 27 | 19 | 20 | 31 | 13 | 7 | 13 | 19 | 27 | 31 | 13 | 13 | 13 |

In accordance with expectations, all α-glucans tested led to a lower post-prandial glycemic response as compared to the fully digestible maltodextrin control. An α-glucan structure with alternating α1-3/6 linkages gives a significant reduction of glucose response compared to glucose syrup when the MW is higher than 1.6 kDa (DP>10). Indeed, in healthy volunteers, glucose-based saccharides DP17.3 gives a 38% (p<0.01) reduction of glucose response (2 h-iAUC).

Unlike fibres generating colonic fermentation due to partial digestion, the results of this clinical trial suggest that α-glucans are largely digestible as none of the product tested generated breath hydrogen as a result of colonic fermentation. Moreover, the evaluation of gastrointestinal tolerance showed a very low discomfort not different of that reported for reference product.

REFERENCES

1. Distiller, L. A., I. Cranston, and R. Mazze, First Clinical Experience with Retrospective Flash Glucose Monitoring (FGM) Analysis in South Africa: Characterizing Glycemic Control with Ambulatory Glucose Profile. J Diabetes Sci Technol, 2016. 10(6): p. 1294-1302.
2. Bonora, B., et al., Head-to-head comparison between flash and continuous glucose monitoring systems in outpatients with type 1 diabetes. J Endocrinol Invest, 2016. 39(12): p. 1391-1399.
3. Schierenbeck, F., A. Franco-Cereceda, and J. Liska, Accuracy of 2 Different Continuous Glucose Monitoring Systems in Patients Undergoing Cardiac Surgery. J Diabetes Sci Technol, 2017. 11(1): p. 108-116.
4. Akintola, A. A., et al., Accuracy of Continuous Glucose Monitoring Measurements in Normo-Glycemic Individuals. PLoS One, 2015. 10(10): p. e0139973.
5. Internal Standard Organization, Food Products—Determination of the Glycaemic Index (GI) and Recommendations for Food Classification. ISO 26642. 2010.
6. Grysman, A., T. Carlson, and T. M. Wolever, Effects of sucromalt on postprandial responses in human subjects. Eur J Clin Nutr, 2008. 62(12): p. 1364-71.
7. Benjamini, Y. and Y. Hochberg, Controlling the False Discovery Rate: a Practical and Powerful Approach to Multiple Testing. J Roy Stat Soc, 1995. 57: p. 289-300.
8. Senn, S., Cross-over Trials in Clinical Research. 2002, Chichester: New York: J. Wiley.

The invention claimed is:

1. A digestible carbohydrate composition comprising
   a. at least 65% (w/w) glucose-based saccharides on a dry basis, wherein the saccharides have a reducing end and D-glucose monomers linked with alternating α1-6 and α1-3 glycosidic linkages, wherein an acceptor molecule is present at the reducing end; and
   b. 0.1 to 30% (w/w) of fructose equivalents on a dry basis;
   wherein the glucose-based saccharides have an average degree of polymerization greater than 16 and less than 18 as measured by HPAEC-PAD.

2. The digestible carbohydrate composition according to claim 1, wherein
   the average degree of polymerization is greater than 17 and less than 18 as measured by HPAEC-PAD.

3. The digestible carbohydrate composition according to claim 1, wherein the composition comprises at least 80% (w/w) glucose-based saccharides on a dry basis.

4. The digestible carbohydrate composition according to claim 1, wherein the composition comprises 0.1 to 10% (w/w) of fructose equivalents on a dry basis.

5. The digestible carbohydrate composition according to claim 4, wherein the fructose equivalents are selected from the group consisting of leucrose, fructose sucrose, and combinations thereof.

6. The digestible carbohydrate composition according to claim 1, wherein the acceptor molecule is a maltose unit.

7. The digestible carbohydrate composition according to claim 3, wherein the composition comprises at least 85% (w/w) glucose-based saccharides on a dry basis.

8. A food product or beverage comprising a digestible carbohydrate composition comprising
   a. at least 65% (w/w) glucose-based saccharides on a dry basis, wherein the saccharides have a reducing end and D-glucose monomers linked with alternating α1-6 and α1-3 glycosidic linkages, wherein an acceptor molecule is present at the reducing end; and
   b. 0.1 to 30% (w/w) of fructose equivalents on a dry basis;
   wherein the glucose-based saccharides have an average degree of polymerization greater than 16 and less than 18 as measured by HPAEC-PAD.

9. The food product or beverage according to claim 8, wherein the food product or beverage is a supplement.

10. The food product or beverage according to claim 8, wherein the food product or beverage is a nutritional product.

11. The food product or beverage according to claim 10, wherein the nutritional product is for a human subject under acute care.

12. The food product according to claim 8, wherein the food product is a pet food product.

13. A method of reducing postprandial glucose in a subject, comprising administering an effective amount of a digestible carbohydrate composition comprising
   a. at least 65% (w/w) glucose-based saccharides on a dry basis, wherein the saccharides have a reducing end and D-glucose monomers linked with alternating α1-6 and α1-3 glycosidic linkages, wherein an acceptor molecule is present at the reducing end; and
   b. 0.1 to 30% (w/w) of fructose equivalents on a dry basis;

wherein the glucose-based saccharides have an average degree of polymerization greater than 16 and less than 18 as measured by HPAEC-PAD.

14. The method according to claim 13, wherein the subject is a human subject.

15. The method according to claim 13, wherein the subject is a companion animal subject.

\* \* \* \* \*